Sept. 16, 1930.  G. CARLSON  1,776,146
ELECTRIC CONVENIENCE OUTLET
Filed Jan. 26, 1928
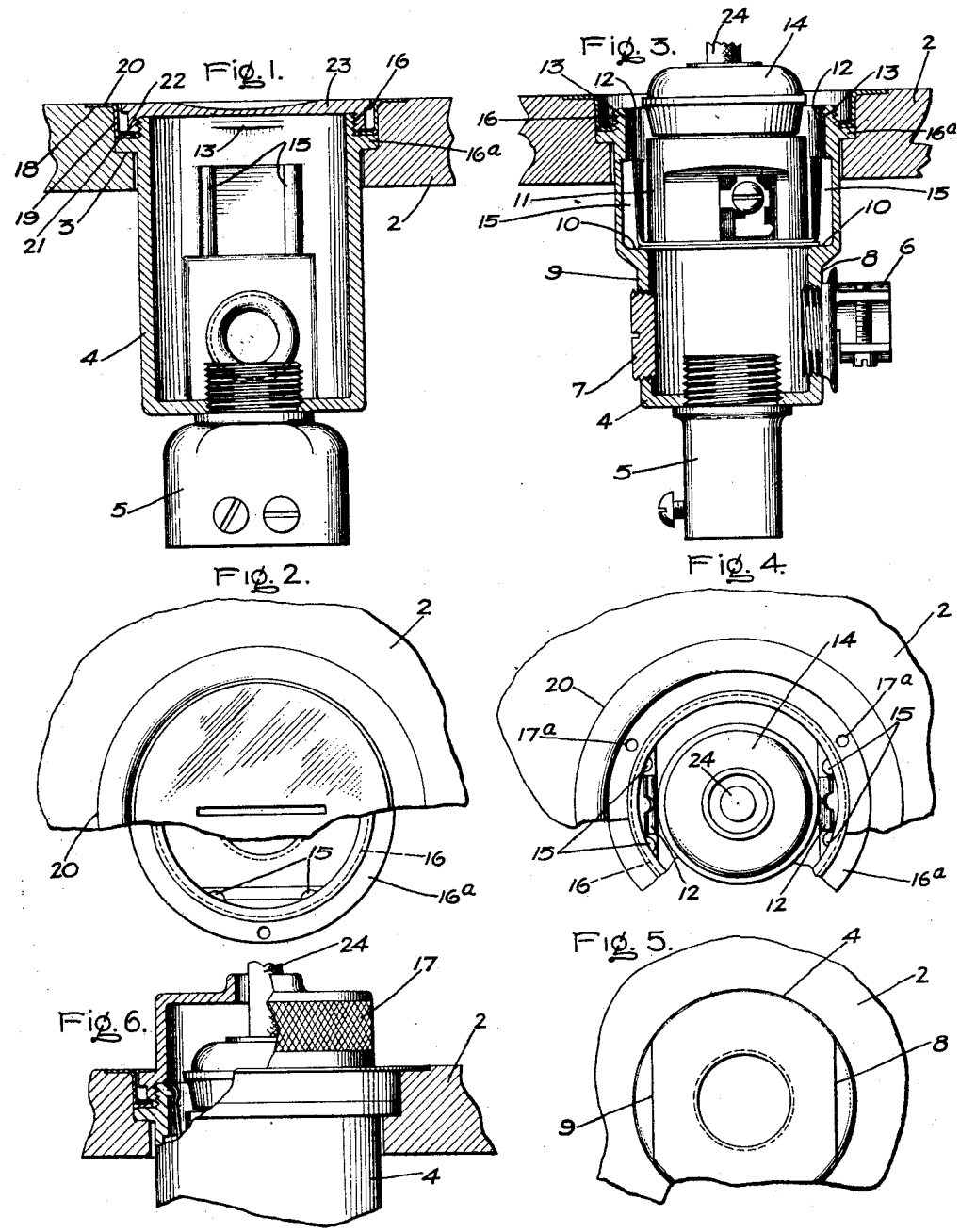
Inventor:
George Carlson,
by Charles E. Tullar
His Attorney.

Patented Sept. 16, 1930

1,776,146

UNITED STATES PATENT OFFICE

GEORGE CARLSON, OF ANSONIA, CONNECTICUT, ASSIGNOR TO GENERAL ELECTRIC COMPANY, A CORPORATION OF NEW YORK

ELECTRIC CONVENIENCE OUTLET

Application filed January 26, 1928. Serial No. 249,678.

My invention relates to convenience outlets. More particularly, it relates to that type of outlet which is adapted for use, for example, on floors instead of along a wall, although it may be used on a wall as well.

It is an object of the invention to provide an outlet of the foregoing character which is simple, which is rugged and comparatively cheap to manufacture, and which is waterproof.

The invention will be more clearly understood by reference to the accompanying specification and claims, reference being had to the accompanying drawing in which Fig. 1 shows in elevation and partly in section the convenience outlet of the invention with its cap in place the plug having been previously removed. Fig. 2 is a top view of the device of Fig. 1. Fig. 3 is a view in elevation and partly in section of the outlet of the invention with the cap removed and with the plug in the socket. Fig. 4 is a top view of the device of Fig. 3 partly broken away. Fig. 5 is a bottom view of the device of Fig. 3 partly broken away. Fig. 6 shows the device of Fig. 3 with a hood over the plug and socket instead of the cap shown in Fig. 1.

Referring more in detail to the accompanying drawing it will be seen that a hole is made in the floor 2. This hole is countersunk in order to form a flange 3. Within this hole is inserted an outlet casing 4. This casing is provided at the bottom with an inlet cable terminal 5. The casing is also provided with openings on either side which may be used to receive cable terminals such as the terminal 6, Fig. 3. On the other hand, if no terminal is to be used, the hole may be closed by the use of a plug 7. The openings for the elements 6 and 7 are made on the sides of the casing along the flat faces 8 and 9. These faces extend parallel to each other and to the axis of the casing. The nature of this construction is best indicated in Fig. 3. The shoulders 10 formed by this construction serve as a seat for the socket element 11. This element is provided with springs 12, both sides of which, when the element 11 is pressed home in the casing 4, latch over the ridges 13 thereby preventing the socket from being withdrawn when the plug element 14 is pulled. Furthermore, the casing 4 is provided on the inside with a pair of ridges 15, as clearly shown in Figs. 1, 2, 3 and 4. These ridges prevent the socket from turning in the casing. The casing has also a series of threads 16 on the outside and near the mouth thereof for screwing either of the caps 17 or 23 thereover as shown in Figs. 1 and 6. The casing has also a flange 16ª on the outside thereof which rests in turn upon the flange 3, which latter is located within the floor opening. Therefore, the flanges 3 and 16ª serve to hold the casing 4 in position. The flange 16ª is also provided with screw holes 17ª by means of which the casing is screwed to the flange 3. The rim 18 about the hole in the floor is protected by means of a metal ring 19, which ring is provided with a flange 20 on the top of the floor and is also provided with a flange 21 which is seated over the flange 16ª of the casing. Above the flange 21 there is provided a gasket element 22 which is adapted to be clamped between the cap 23 and the flange 21 or between the cap 17 and the flange 21 as shown in Fig. 5. This element 21 serves to render the device watertight to prevent any moisture from creeping into the casing 4 over the threads 16 and through the mouth of the casing. When the casing is not in use, that is, when plug 14 is removed from the casing, the latter may be covered and maintained water-tight by means of a cover 23 which takes the place of the cover 17. It will be seen from Fig. 6 that the cover 17 has an opening through which the cable 24 that leads into the plug element 14 passes. This plug element is provided with plug terminals for engaging the terminals in the socket element 11 in the usual manner.

While I have elected to illustrate my invention in connection with concrete embodiments as shown in the drawing, I do not wish to be limited to such specific construction inasmuch as I contemplate variations and modifications within the spirit of the invention and the scope of the claims contained herein.

What I claim as new and desire to secure by Letters Patent of the United States is:

1. A convenience outlet provided with a container, a support for said container, an opening in said support countersunk to form a ledge, said ledge serving as a seat for said container, a shield about said opening and above said ledge for protecting the rim of the opening, a cap for said container, and means for securing said cap to said container and for clamping said shield to said container, said means consisting of threads on the outside of said container and corresponding threads on the inside of said cap.

2. A convenience outlet provided with a container, a support for said container, an opening in said support countersunk to form a ledge, said ledge serving as a seat for said container, a shield about said opening and above said ledge for protecting the rim of the opening, a cap for said container, means for securing said cap to said container and for clamping said shield to said container, said means consisting of threads on the outside of said container and corresponding threads on the inside of said cap, and a gasket interposed between said cap and said container for rendering the connection between the cap and the container water-tight.

3. A convenience outlet provided with a container having an opening, a flange around said opening on the outside of the container, a support for said container, an opening in said support countersunk to form a ledge, said ledge serving as a seat for said flange, a metal shield about said opening and above said flange, said shield having a rim overlapping said flange and having another rim overlapping said support for protecting the rim of the opening, a cap for said container, and means for clamping said shield between the cap and the said flange.

4. In a convenience outlet, in combination, a container, a collar about said container near one end thereof, a support for said container, an opening in said support countersunk to form a ledge, said ledge supporting said collar, a shield for protecting the rim of said opening, said shield being in the form of a ring having an annular portion located in said opening above said ledge, said ring having a pair of flanges, one extending in one direction and overlapping the support and the other located in said opening extending in the opposite direction and overlapping said collar, a cap for the said end of said container, and means for clamping said flange in said opening between the cap and the collar.

In witness whereof, I have hereunto set my hand this 23rd day of January, 1928.

GEORGE CARLSON.